United States Patent
Zeng et al.

(10) Patent No.: US 10,628,611 B2
(45) Date of Patent: Apr. 21, 2020

(54) EXCLUSIVE EXECUTION ENVIRONMENT WITHIN A SYSTEM-ON-A-CHIP COMPUTING SYSTEM

(71) Applicant: QUALCOMM Incorporated, San Diego, CA (US)

(72) Inventors: Thomas Zeng, San Diego, CA (US); Azzedine Touzni, Carlsbad, CA (US); Brian Kelley, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 308 days.

(21) Appl. No.: 15/344,384

(22) Filed: Nov. 4, 2016

(65) Prior Publication Data

US 2018/0129828 A1 May 10, 2018

(51) Int. Cl.
*G06F 21/71* (2013.01)
*G06F 21/74* (2013.01)
*G06F 21/79* (2013.01)
*G06F 21/53* (2013.01)
*G06F 21/78* (2013.01)

(52) U.S. Cl.
CPC ............ *G06F 21/71* (2013.01); *G06F 21/53* (2013.01); *G06F 21/74* (2013.01); *G06F 21/78* (2013.01); *G06F 21/79* (2013.01); *G06F 2221/2149* (2013.01)

(58) Field of Classification Search
CPC .......... G06F 21/71; G06F 21/53; G06F 21/74; G06F 21/78; G06F 21/79; G06F 2221/2149
See application file for complete search history.

(56) References Cited

U.S. PATENT DOCUMENTS

| 8,473,754 B2 | 6/2013 | Jones et al. |
| 8,843,769 B2 | 9/2014 | Kimelman |
| 9,063,889 B2 | 6/2015 | Conti et al. |

(Continued)

OTHER PUBLICATIONS

PC Client Platform Firmware Profile Specification, Family 2.0, Level 00, Revision 00.21, published Mar. 30, 2016.

(Continued)

*Primary Examiner* — David Le
(74) *Attorney, Agent, or Firm* — Loza & Loza, LLP

(57) ABSTRACT

Exemplary features pertain to establishing an Exclusive Execution Environment domain that Trusted Execution Zone components are forbidden to access. In one example, a system-on-a-chip (SoC) is equipped with a Reduced Instruction Set Computing (RISC) processor along with an application DSP (ADSP) and/or Graphics Processing Unit (GPU), where the ADSP and/or GPU is configured to provide and enforce the Exclusive Execution Environment domain. By forbidding access to Trusted Execution Zone components, security can be enhanced, especially within minimally-equipped devices that do not have the resources to implement a full Trust Execution Environment, such as low-power devices associated with the Internet of Things (IoT). Among other features, the systems and methods described herein allow application clients to build exclusive execution environments and claim exclusive access to buffer objects and hardware resource groups. Method and apparatus examples are provided.

30 Claims, 12 Drawing Sheets

(56) References Cited

U.S. PATENT DOCUMENTS

| | | | |
|---|---|---|---|
| 2004/0049293 A1* | 3/2004 | Hadwiger | G06F 13/36 700/4 |
| 2006/0010264 A1* | 1/2006 | Rader | B65H 35/0013 710/23 |
| 2007/0271618 A1* | 11/2007 | Chao | G06F 21/6218 726/27 |
| 2012/0159446 A1* | 6/2012 | Jentsch | G06F 9/44 717/124 |
| 2013/0282951 A1* | 10/2013 | Kuo | G06F 21/575 711/102 |
| 2014/0075502 A1* | 3/2014 | Aissi | G06F 21/60 726/1 |
| 2015/0002523 A1 | 1/2015 | Zeng et al. | |
| 2016/0048678 A1 | 2/2016 | Thom et al. | |
| 2016/0070932 A1 | 3/2016 | Zimmer et al. | |
| 2016/0149912 A1 | 5/2016 | Scott-Nash et al. | |
| 2016/0259750 A1* | 9/2016 | Keidar | G06F 9/45558 |
| 2016/0283409 A1 | 9/2016 | Pandey et al. | |
| 2017/0004084 A1* | 1/2017 | Kim | G06F 12/0831 |
| 2017/0357960 A1* | 12/2017 | Quentin | G06Q 20/02 |

OTHER PUBLICATIONS

International Search Report and Written Opinion—PCT/US2017/058953—ISA/EPO—dated Feb. 1, 2018.

* cited by examiner

*Exemplary Operations for use by an ADSP or GPU of a Computing System having a Trusted Execution Environment* ⟋1200

⟋1202

Designate a portion of a memory space of a computing system having a RISC core processor and an application digital signal processor (ADSP) and/or Graphics Processing Unit (GPU) or other General Processor (GP) as an exclusive execution environment (EEE or E3) domain that components of the trusted execution environment (such as components of a reduced version of the TrustZone® execution environment) are forbidden to access, wherein the exclusive execution environment domain is initially designated by the ADSP (or GPU) while bootstrapping from a local read only memory (ROM).

⟋1204

Use the ADSP (or GPU) to forbid access to the exclusive execution environment domain by components of the RISC core processor, wherein the exclusive execution environment domain is enforced by a hardware component of the ADSP that provides slave-side protection of the memory space of the exclusive execution environment domain and wherein the computing system includes a Memory Processor Unit (MPU) that provides a master-side bypass to permit components of the ADSP (or GPU) to access the exclusive execution environment domain.

⟋1206

Confirm or disconfirm the exclusivity of the exclusive execution environment domain by having a component of the trusted execution environment attempt to access the memory space of the exclusive execution environment domain.

⟋1208

If access to the memory of the exclusive execution environment domain is gained by the component of the trusted execution environment, exclusivity is thereby disconfirmed; otherwise if access to the memory of the exclusive execution environment domain is refused to the component of the trusted execution environment, exclusivity is thereby confirmed.

*FIG. 12*

EXCLUSIVE EXECUTION ENVIRONMENT WITHIN A SYSTEM-ON-A-CHIP COMPUTING SYSTEM

BACKGROUND

Field of the Disclosure

Various features relate to system-on-a-chip (SoC) computing systems employing trusted execution environments and more particularly to establishing an exclusive execution environment using a digital signal processor (DSP) or other general purpose (GP) processor of the SoC such as a graphics processing unit (GPU).

Description of Related Art

State-of-the-art computing systems and processing devices may include a System-on-a-Chip (SoC), such as the Qualcomm Snapdragon® chip, which is provided with hardware (HW) and software (SW) components to establish a trusted execution environment. One example of a trusted execution environment is TrustZone® (TZ) provided by ARM® (where TrustZone and ARM are registered trademarks/service marks of ARM Limited Corporation). Such SoC-based systems may employ a digital signal processor (DSP) or other general purpose computer processor such as a graphics processor unit (GPU) on the SoC in addition to one or more core processors such as an ARM Reduced Instruction Set Computing (RISC) processor. Within such systems, there is a need to provide a methods or apparatus to protect the DSP execution environment from attack by a compromised TZ component. This problem may be especially important within minimally-equipped devices such as low-power devices associated with the Internet-of-Things (IoT) that may include a SoC but do not have the resources to implement the full protections afforded by TZ or by similar trust systems and protocols. However, the exemplary systems and methods described herein are not limited to IoT devices and are more generally applicable in any system or device where it is advantageous to transfer secure memory between domains without requiring mutual trust.

SUMMARY

In one aspect, a method for use by a processor of a computing system equipped with a trusted execution environment includes: designating a portion of a memory space of the computing system as an exclusive execution environment domain that components of the trusted execution environment are forbidden to access; preventing access by components of the trusted execution environment to the exclusive execution environment domain; and accessing the exclusive execution environment domain using components of the processor that are outside the trusted execution environment In another aspect, a device includes a memory device, and a processor coupled to the memory device, the processor configured to: designate a portion of a memory space of the memory device as an exclusive execution environment domain that components of the trusted execution environment are forbidden to access; prevent access by components of the trusted execution environment to the exclusive execution environment domain; and access the exclusive execution environment domain using components of the processor that are outside the trusted execution environment.

In yet another aspect, a device for use with a processor of a computing system equipped to provide a trusted execution environment includes: means for designating a portion of a memory space of the computing system as an exclusive execution environment domain that components of the trusted execution environment are forbidden to access; means for preventing access by components of the trusted execution environment to the exclusive execution environment domain; and means for accessing the exclusive execution environment domain using components of the processor that are outside the trusted execution environment.

In still yet another aspect, a non-transitory machine-readable storage medium for use with a computing system equipped with a trusted execution environment has one or more instructions which when executed by at least one processing circuit causes the at least one processing circuit to: designate a portion of a memory space of the computing system as an exclusive execution environment domain that components of the trusted execution environment are forbidden to access; prevent access by components of the trusted execution environment to the exclusive execution environment domain; and access the exclusive execution environment domain using components of the processor that are outside the trusted execution environment.

BRIEF DESCRIPTION OF THE DRAWINGS

FIG. 12 further illustrates exemplary procedures for use by a processor of a computing system having a trusted execution environment.

DETAILED DESCRIPTION

Figure 1:
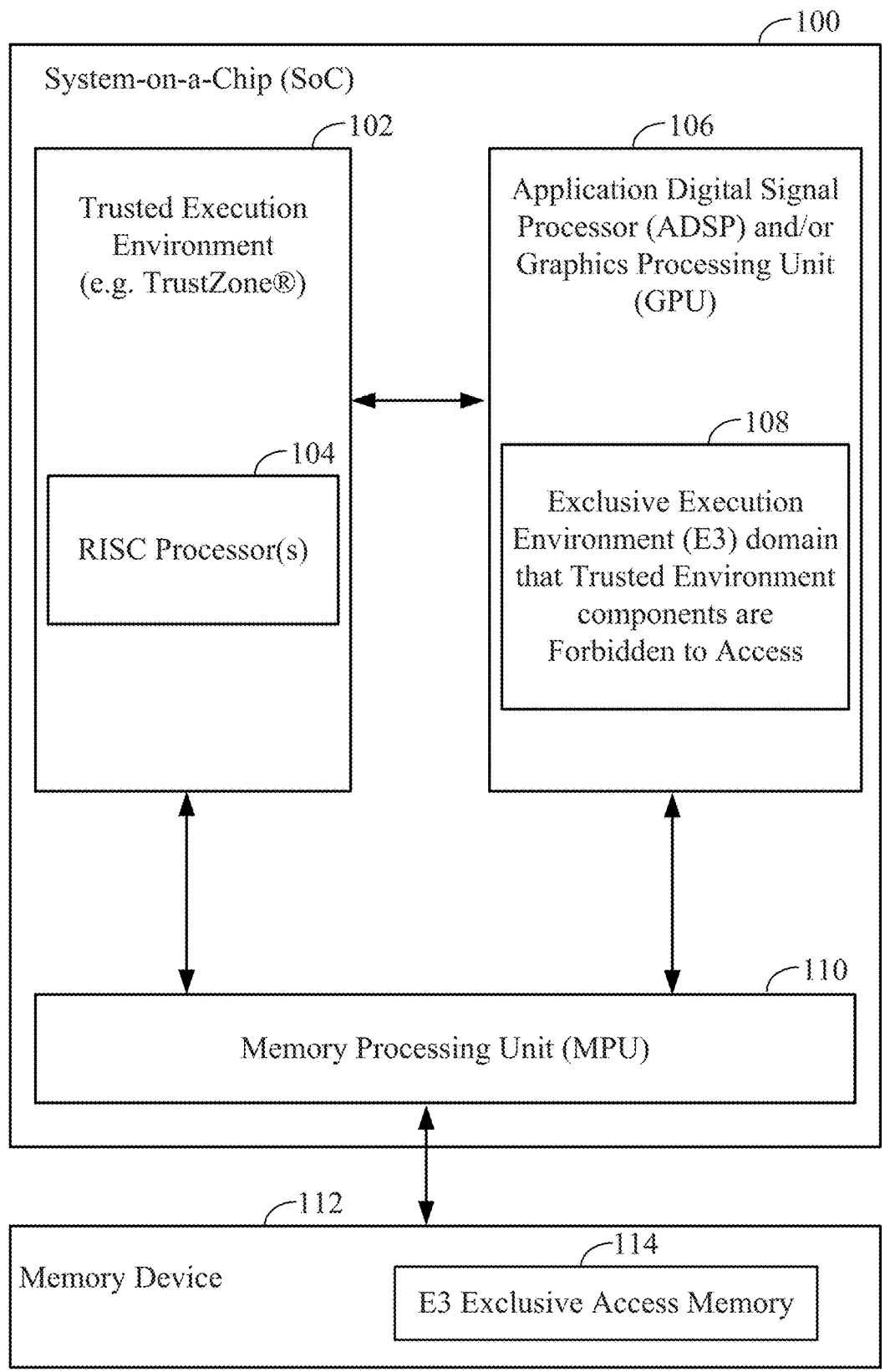
FIG. 1 is a high-level schematic block diagram illustrating selected components of a computing system provided with an application digital signal processor (ADSP) and/or Graphics Processing Unit (GPU) where the computing system is equipped to establish an exclusive execution environment (E3 or EEE) domain that trusted execution environment components of the system are forbidden to access.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to methods and apparatus for use with the computing systems of wireless communication devices that include a System-on-a-Chip (SoC) having one or more Reduced Instruction Set Computing (RISC) processors along with at least one Digital Signal Processor (DSP). Herein, the term DSP is intended to encompass a wide variety of non-core processors such as Graphics Processing Units (GPUs) and the like. Some state-of-the-art computing systems that include a SoC—such as the Qualcomm Incorporated Snapdragon® chip—employ one or more ARM® RISC processors and are equipped with TrustZone® (TZ) or similar trusted execution environment architectures. (As noted above, TrustZone and ARM are registered trademarks/service marks of ARM Limited Corporation.)

Briefly, TZ provides a system-wide approach to security for use on numerous chips to protect services and devices, including smartphones, tablets, personal computers, wearables, etc. TZ is typically built into SoCs by semiconductor chip designers who want to provide secure End Points and Roots of Trust. In the exemplary systems described herein, the DSP of a SoC equipped with TZ is configured to establish an Exclusive Execution Environment (E3) that conventional TZ components are forbidden to access.

In one example, the SoC includes one or more RISC processors along with an application DSP (ADSP) such as the Compute DSP of Qualcomm Incorporated, where the ADSP is configured to provide the Exclusive Execution Environment (E3). (In other examples, a GPU or other general processor (GP) may be used, additionally or alternatively.) Among other features, the systems and methods described herein allow application clients to build exclusive execution environments and claim exclusive access to buffer objects and HW resource groups, both represented by memory regions. Note that exclusiveness is not affected by the High Level Operating System (HLOS)/Hypervisor/TZ/Secure Monitor stack of the RISC system software (SW). That is, in some examples, memory buffers may be transferred between domains without requiring mutual trust between the domains. This is achieved, for example, by providing application stack software with a means to exclusively allocate secure buffers in such manner that the buffers can then be verified to be inaccessible by operating system SW components such as TZ or Hypervisor components. This allows for at least some processing to be conveniently shifted from the central processing unit (CPU), e.g. the RISC processor, to the ADSP (and/or GPU) in a manner that is transparent to the SW and HLOS. In this manner, secure memory may be allocated anywhere on the SoC in a way that does not rely on TZ or a Hypervisor. Note also that, although described primarily with respect to examples employing TZ, other suitable security architectures may be implemented. Furthermore, although some exemplary systems involve IoT devices, at least some aspects of the systems and methods described herein are more generally applicable to any computing system or device where it is advantageous to transfer secure memory between domains without requiring mutual trust.

FIG. 1 illustrates an exemplary SoC architecture 100 at a high level. The SoC 100 includes a trusted execution environment 102 (e.g. TZ), which includes one or more RISC processors 104. An ADSP (and/or GPU) 106 is equipped or configured to provide an Exclusive Execution Environment (E3) domain 108 that TZ components are forbidden to access. Both the trusted execution environment 102 and the ADSP 106 may communicate with a memory processing unit (MPU), which controls access to an off-chip memory device, such as a double-data rate (DDR) memory device 112. As shown, a portion of memory device 112 may be designated as an E3 exclusive access memory portion or buffer (that only components of E3 108 are permitted to access). By forbidding access to the E3 memory 114 by TZ components, security may be enhanced, especially within minimally-equipped devices that do not have the resources to implement full TZ protection, such as IoT devices (e.g. key fobs, security badges, sensors, household smart devices, etc.). Additionally or alternatively, at least some processing may be shifted from the RISC processor 104 to the ADSP 106 in a manner that is transparent to the HLOS running on the SoC. In one particular example where the SoC is equipped to provide virtual reality (VR) processing, a portion of an overall VR algorithm may be equipped to run on the ADSP in a manner that is transparent to the HLOS by exploiting the E3 domain.

Among other features to be described in detail below, the Exclusive Execution Environment 108 may be established by having the ADSP 106 bootstrap from a local ROM (not shown in FIG. 1) instead of depending on a system SW stack in the TZ domain 102 for its Chain of Trust. This procedure includes a mechanism by which components of the ADSP 106 claim exclusive memory permission to a portion of memory (via a suitable "Claim" function). Once the exclusive memory domain is established, a mechanism is provided to verify that the memory region is exclusive. This may be achieved, as will be explained below, by implementing a function (referred to as "VerifyClaim") that verifies the exclusivity by having components of the TZ 102 attempt to access the exclusive access memory 114. Since the TZ components are forbidden to access that memory, the access attempt should be denied and, if not, then exclusivity is disconfirmed. In this regard, an initially successful "Claim" does not guarantee exclusive access if supervisor SW running in the trusted environment 102 is compromised. Hence, the VerifyClaim function is provided that employs HW or firmware (FW) to verify that the supervisor SW has complied with the initial Claim to exclusive access and has not been compromised. As will be explained, the mechanism to verify the claim to exclusive memory access may be implemented via a System Memory Management Unit (MMU) (i.e. a SMMU) bypass checker and via ownership of a memory protection slot.

Thus, in some implementations, systems and methods are provided that: (1) establish an Exclusive Execution Environment that bootstraps from local ROM instead of depending on a system SW stack in TZ domain for Chain of Trust; (2) provide a mechanism to allow the Exclusive Execution Environment to claim exclusive memory permission; and (3) provide a mechanism to verify the claim to exclusive memory access. The verification of exclusive memory access may be achieved by providing: a) the aforementioned SMMU bypass checker; b) a protocol to convey ownership of memory protection slot/xPU partitions; c) a protocol to transfer the ownership and lock after boot in a "mutual distrust" model; and d) a transfer of peripheral master ownership using an xPU partition ownership transfer protocol.

Although described primarily in connection with examples wherein the processor is a RISC processor and the trusted execution environment is TZ, various features described herein may be exploited within other processor systems or within other trust systems and protocols and, in particular, within computing systems that do not implement a full version of TZ or any version of TZ.

Exemplary Hardware Environment

Aspects of the systems and methods described herein can be exploited using a wide variety of computing systems and for a wide range of applications, including mobile devices, servers, IoT devices, etc. To provide a concrete example, an exemplary hardware environment will now be described that uses an ARM® RISC-based CPU with TZ.

Figure 2:
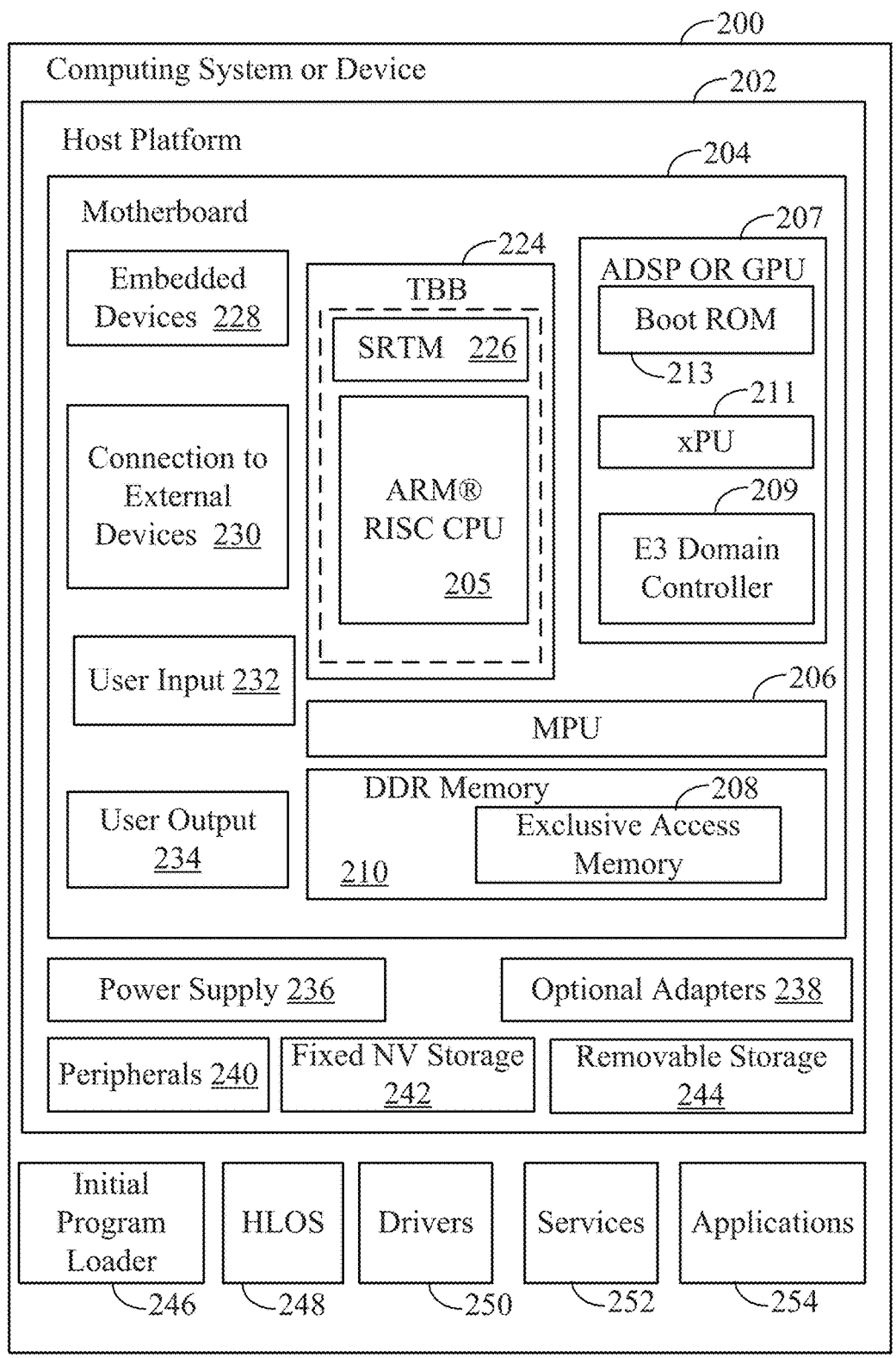
FIG. 2 is a schematic block diagram illustrating an exemplary computing system equipped with a RISC processor and an ADSP (and/or GPU) with E3 control components.

FIG. 2 illustrates selected components of an ARM® computing architecture modified to incorporate exclusive execution environment (E3) components. Computing system or device 200 includes a host platform 202 provided with a motherboard 204 that includes, among various other components, an ARM® CPU 205 and an ADSP (and/or GPU) 207. The ADSP (and/or GPU) 207 includes (among other components not shown) an E3 domain controller 209, which designates and controls the aforementioned E3 domain, including an exclusive access memory portion or buffer 208 of a DDR memory 210. The ADSP 207 also includes an xPU 211, which helps enforce the exclusivity, and a boot ROM 213. Note that, in this example, the CPU 205 is a component of a Trusted Building Block (TBB) 224, which also includes HW and/or SW that establishes a Root of Trust (i.e. provides an integrity measurement) for TZ components and provides connectivity between a Static Root of Trust for Measurement (SRTM) component 226, the motherboard 204, platform reset components (not separately shown), and a TPM (if one is provided). Note also that the CPU 205 and the ADSP 207, along with other components, may be implemented as a System-on-a-Chip (SoC), which may include other devices or components as well.

Various other exemplary components and features of system 200 are also shown in FIG. 2. Briefly, in this example, the motherboard 204 additionally includes various other embedded devices 228, connections 230 to external devices, and user input 232 and user output 234 components. The host platform includes a power supply 236, optional adapters 238, peripherals 240, fixed nonvolatile storage 242 and removable storage 244. The overall system 200 further includes an initial program loader 246, the HLOS 248 (which typically runs on the CPU 205), various drivers 250, various services 252 and various applications 254 (where the drivers, services and applications may run on the CPU 205 on other processing components of the overall systems).

Further information regarding some of the components shown in FIG. 2 may be found within *PC Client Platform Firmware Profile Specification*, Family 2.0, Level 00, Revision 00.21, published Mar. 30, 2016 or other suitable documents, such as revision 20v43 of that specification. Those skilled in the art will recognize that modifications may need to be made, where appropriate, to some of these components to accommodate the modifications described herein that provide the exclusive execution environment (E3).

Exemplary Implementation

Figure 3:
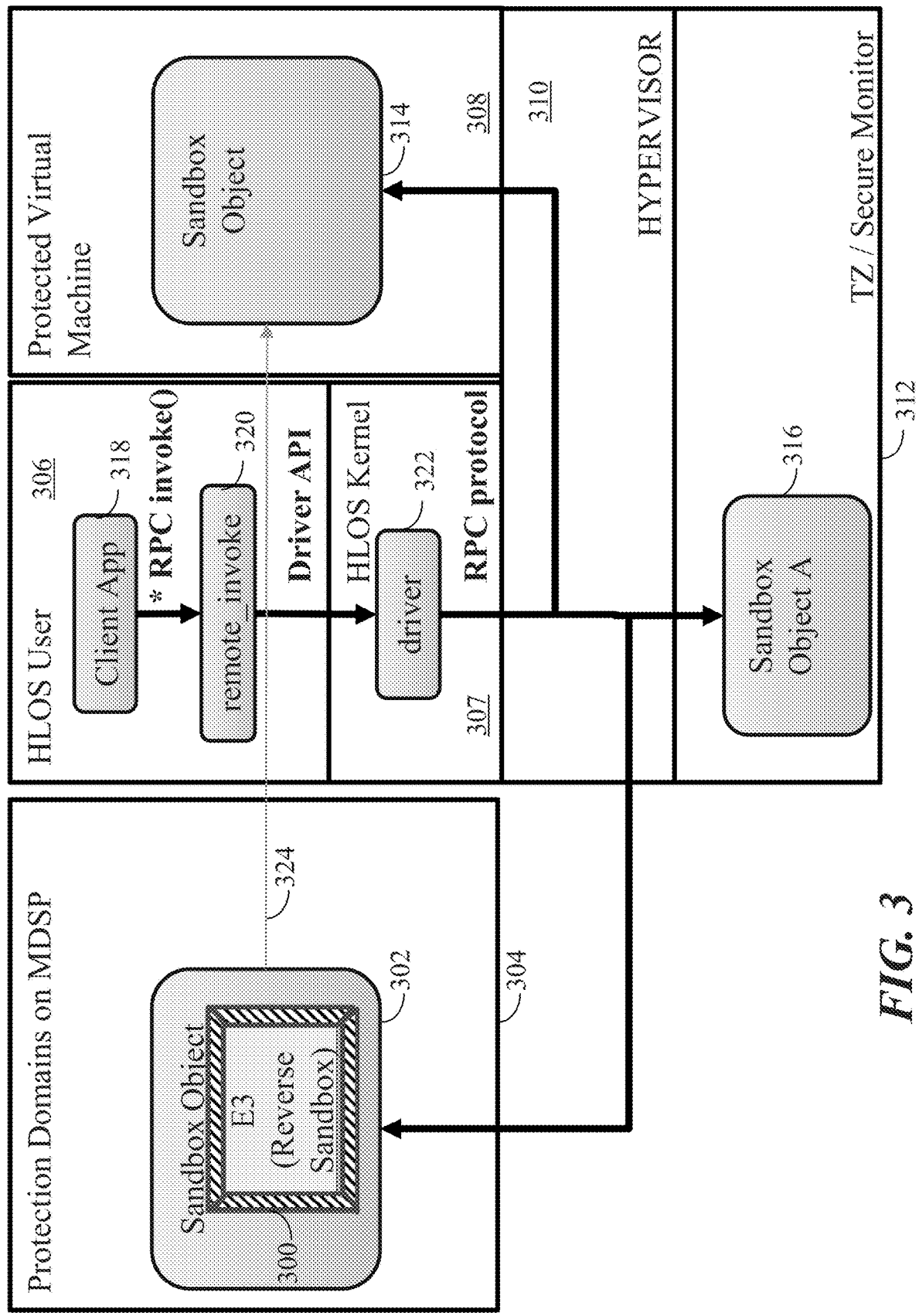
FIG. 3 is a schematic block diagram illustrating the nesting of the exclusive execution environment (E3) within a sandbox of a protection domain of a modem DSP (MDSP) of the exemplary system and its relation to other components and domains.

FIG. 3 illustrates the nesting of the exclusive execution environment (E3) 300 within a sandbox 302 of a protection domain 304 of a modem DSP (MDSP) component of the overall system and its relation to other components and domains (where a "sandbox" is a security mechanism for separating running programs). Note that in this configuration, the E3 domain 300 operates as a reverse sandbox, where "reverse sandboxing" provides a mechanism for exporting protected environments so as to guarantee or assure that the environment is not accessed in an unauthorized manner. With E3 thus nested in a normal sandbox, the Trusted Computing Base of the system consists of: a) a trust anchor (TA); b) about twenty-four kilobytes (KBs) of micro-Kernel running in Monitor Level; c) the Modem Self Authentication (MSA) Boot ROM (which is HW ROM); and d) a Modem Boot Authenticator (MBA), which alternatively may be moved to HW/ROM.

FIG. 3 additionally illustrates an HLOS user domain 306, an HLOS kernel 307, a protected virtual machine domain 308, a hypervisor 310 and a TZ secure monitor 312. The protected virtual machine 308 also includes a sandbox object 314 and the TZ secure monitor 312 includes another sandbox object 316 (labeled Object A). The HLOS user 306 includes a client app 318 and a remote_invoke component 320. The HLOS kernel 307 includes a driver 322. In one example, the client app 318 applies a remote procedure call (RPC) "invoke( )" command to component 320, which applies a driver Application Programming Interface (API) command to the driver 322, which in turn invokes an RPC protocol that is applied to each of the sandbox objects 302, 314 and 316. Additionally, as shown by communication line 324, the sandbox object 302 containing the E3 domain 300 communicates with the sandbox objet 314 of the protected virtual machine 308.

Figure 4:
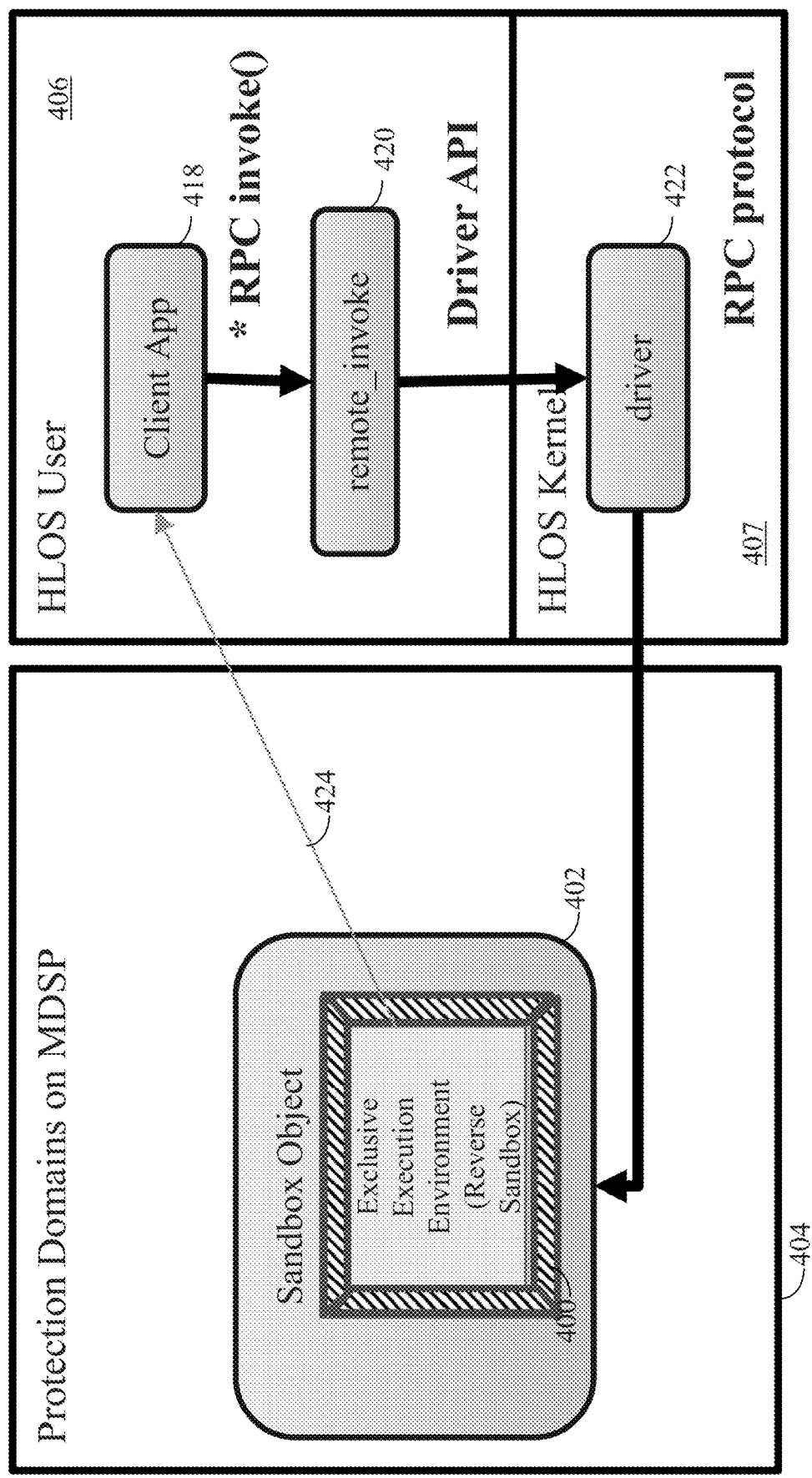
FIG. 4 is a schematic block diagram illustrating the nesting of E3 within a sandbox of an alternative exemplary system appropriate for use with low-power devices associated the Internet-of-Things (IoT).
Figure 5:
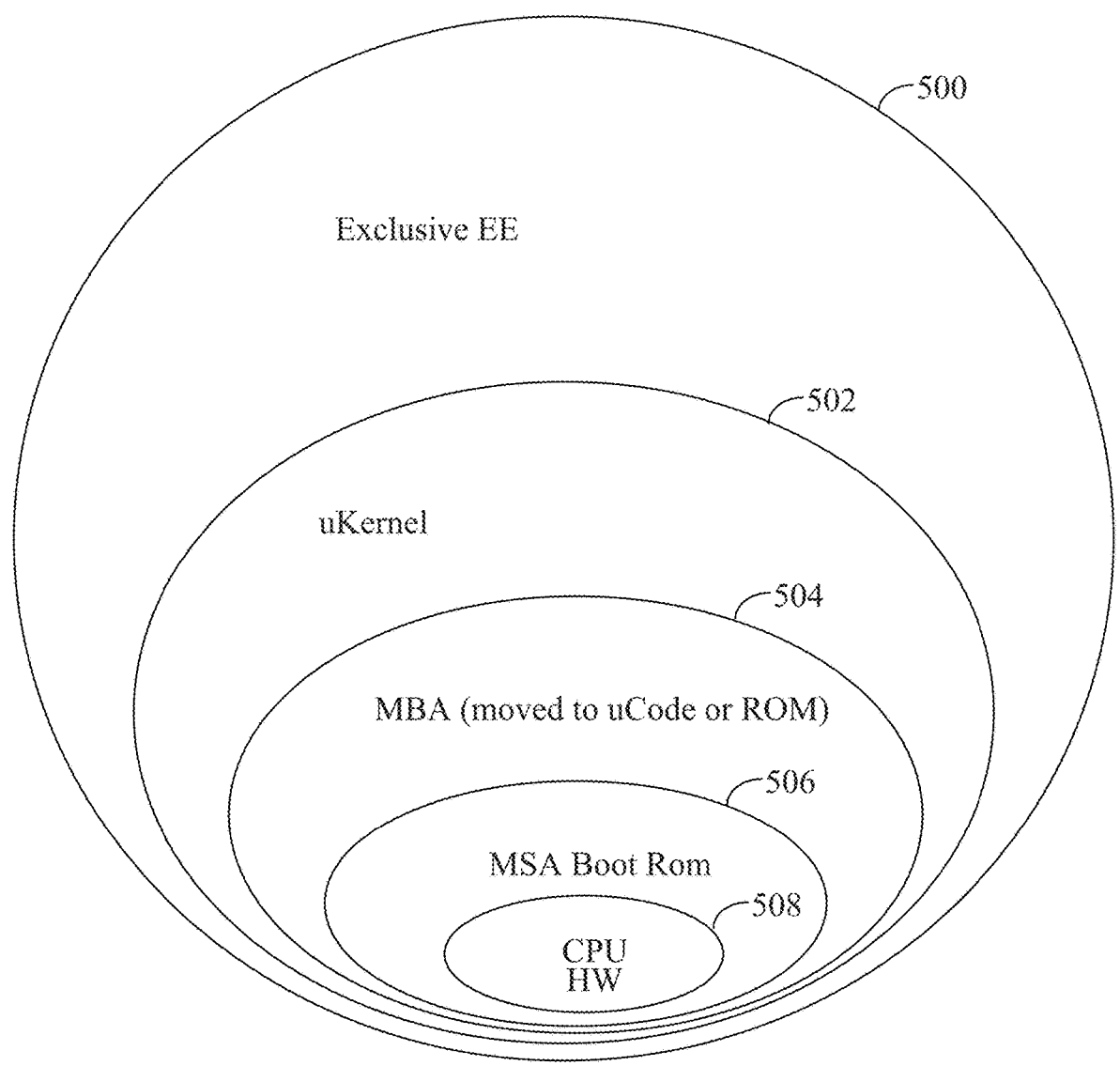
FIG. 5 is a schematic diagram providing an overview of portions of the exclusive execution environment (E3) and its nested subdomains.

FIG. 4 illustrates an alternative system architecture that does not include a protected virtual machine, hypervisor or TZ secure monitor, as may be appropriate for use within inexpensive low-power devices associated the IoT. Briefly, the exclusive execution environment (E3) 400 is again nested within a sandbox 402 of a protection domain 404 of an MDSP component of the overall system. An HLOS user domain 406 and an HLOS kernel 407 are provided. The HLOS user 406 again includes a client app 418 and a remote_invoke component 420. The HLOS kernel 407 includes a driver 422. The client app 418 applies the RPC invoke( ) command to component 420, which applies a driver API command to the driver 522, which in turn invokes an RPC protocol. In this case, the RPC protocol is applied to sandbox object 402 (since the other sandbox objects of FIG. 5 are not also provided in this alternative example). As shown by communication line 424, the sandbox object 402 containing the E3 domain 400 communicates with the client app 418 of the HLOS user 406. As with the configuration of FIG. 3 discussed above, the TSB of the system of FIG. 4 consists of: a) a TA; b) about twenty-four KB of microKernel running in Monitor Level; c) the MSA Boot ROM; and d) the MBA (which alternatively may be moved to HW/ROM in some examples).

FIG. 5 provides a high-level schematic overview of portions of the exclusive execution environment (E3) 500 and its nested subdomains. As shown, the following components or domains are nested within one another: a microKernel (or uKernel) 502, MBA code 504 (which may be provided within microcode (uCode) or ROM in some examples), an MSA boot ROM 506 and a CPU HW 508.

Figure 6:
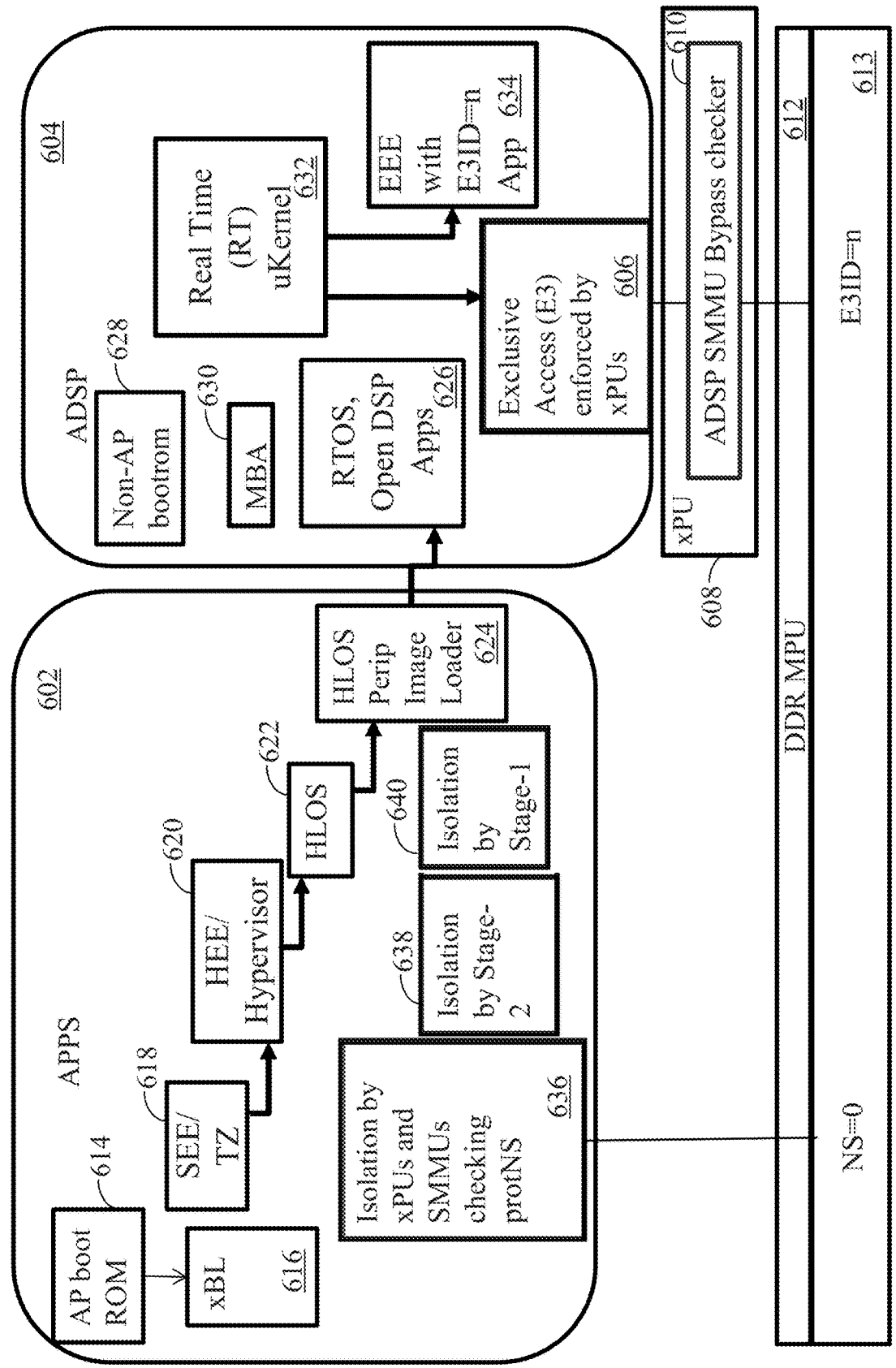
FIG. 6 is a schematic block diagram illustrating further details of an exemplary computing system wherein an E3 domain is created by an ADPS and exclusivity is enforced (at least in part) by one or more xPUs.

FIG. 6 provides details of an exemplary implementation where the E3 domain is created by an ADPS and exclusively is enforced (at least in part) by xPUs. Within FIG. 6, the block labeled APPS 602 represents the TZ environment. Components of an ADSP (and/or GPU) 604 establish the exclusive execution environment (E3) 606, which components of the TZ cannot access. As discussed above, by forbidding access to TZ components, security is enhanced, especially within minimally-equipped devices that do not have the resources to implement full TZ protection. In the example of FIG. 6, the exclusive access is enforced by an xPU 608, which may provide slave-side protection via an ADSP SMMU bypass checker 610. The DDR Memory Processor Unit (MPU) 612 provides a master-side bypass to a DDR memory device 613 to permit components of the ADSP to access the exclusive execution environment. That is, the aforementioned security enhancements are achieved in this example by providing a mechanism in HW and SW that provides protection for a SoC Execution Environment via: 1) a master-side MPU bypass checker and 2) a slave-side xPU checking a new bus signal (e.g. an E3ID signal). An advantage of this mechanism is configuration that, with little or no change in current SoCs, a high Microprocessor Without Interlocked Pipeline Stages (MIPS) computing environment may be provided within the ADSP that is protected against compromised TZ SW.

Turning now to the other components shown in FIG. 6, APPS 602 includes an AP boot ROM 614 coupled to an external boot loader (xBL) 616. A Secure Execution Environment (SEE) or TZ component 618 forwards to commands to a Hypervisor Execution Environment (HEE) or other Hypervisor 620 and, in turn, to the HLOS 622, and then to an HLOS peripheral image loader 624. Loader 624 communicates with a Real Time (RT) OS and any open DSP apps 626. The ADSP 604 additional includes non-AP boot ROM 628, an MBA 630, a RT microKernel (uKernel) 632 and an Exclusive Execution Environment (EEE) (with E3ID=n) app 634. Note that, in this example, the APPS component 602 also includes: a component 636 providing isolation by xPUs and SMMUs checking a protNS value; a component 638 providing isolation by Stage 2; and a component 640 providing isolation by Stage 1. Component 636 accesses an NS=0 portion or partition of the DDR memory 613. The E3 606 accesses an E3ID=n portion or partition of the DDR 613, which the APPS TZ components are forbidden to access.

Figure 7:
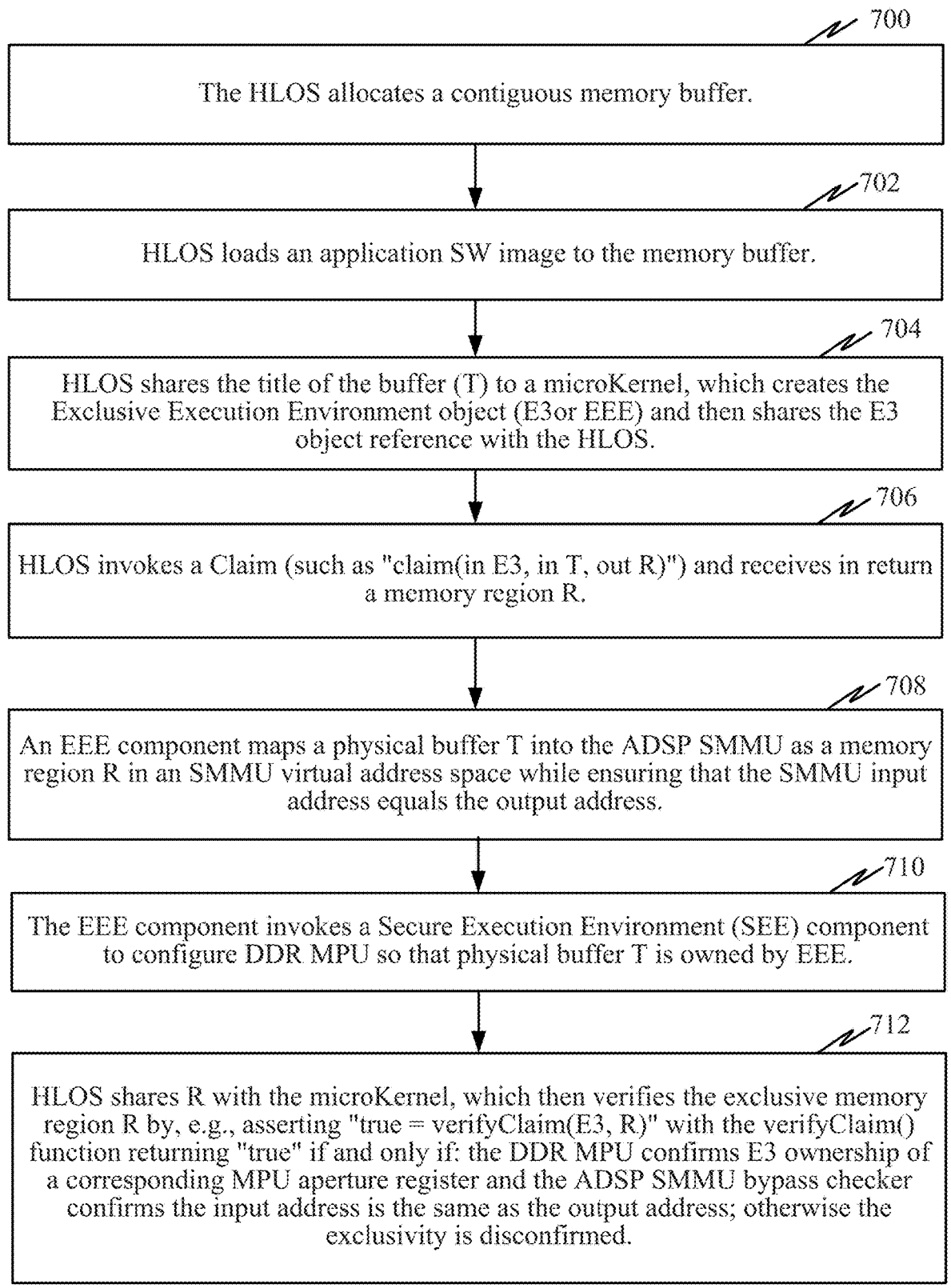
FIG. 7 is a flow diagram summarizing exemplary procedures whereby a Claim to exclusive memory access is implemented and confirmed.

FIG. 7 illustrates a processing example whereby a claim to exclusive memory access is achieved. At 700, the HLOS (e.g. HLOS 622 of FIG. 6) allocates a contiguous memory buffer, then at 702 the HLOS loads an application SW image to the memory buffer. At 704, the HLOS shares or sends the title of the buffer (T) to a uKernel, which creates the Exclusive Execution Environment object (E3) and then shares the E3 object reference with the HLOS. At 706, the HLOS invokes "claim (in E3, in T, out R)" and receives in return a memory region R. The invocation triggers, at 708, an E3 component to map physical buffer T into an ADSP SMMU as a memory region R in an SMMU virtual address space while ensuring that the SMMU input address equals the output address. At 710, an HEE component (e.g. 620 of FIG. 6) invokes a SEE component (e.g. SEE 618 of FIG. 6) to configure the DDR MPU so that physical buffer T is owned by EEE. At 712, the HLOS shares R with the microKernel, which then verifies the exclusive memory region R by asserting "true=verifyClaim (E3, R)." For example, the verifyClaim( ) function returns true if and only if: the DDR MPU confirms E3 ownership of a corresponding MPU aperture register and the ADSP SMMU bypass checker confirms input address==output address. Otherwise, the exclusivity is disconfirmed.

Figure 8:
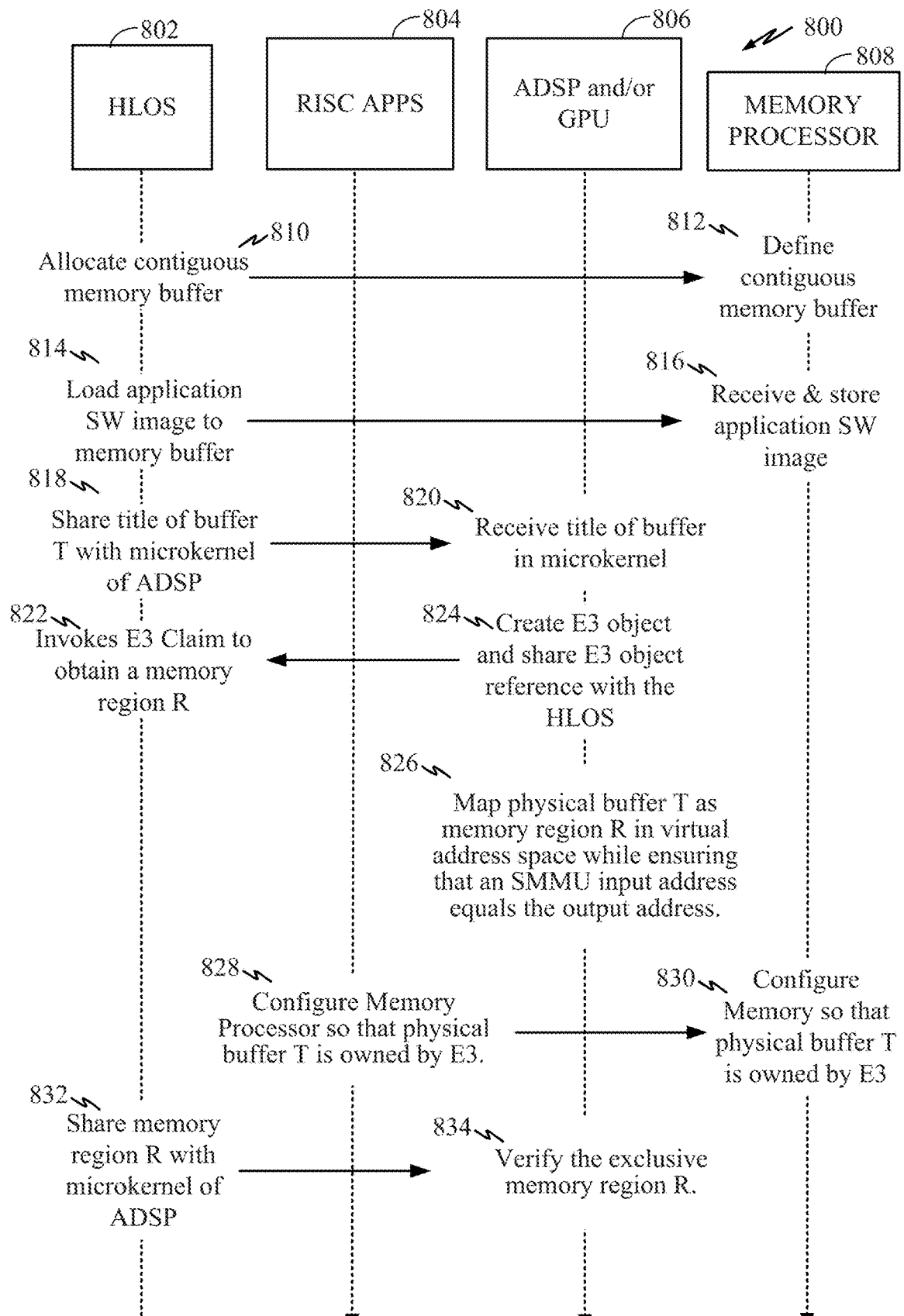
FIG. 8 is a timing diagram illustrating the exemplary procedures whereby a Claim to exclusive memory access is implemented and confirmed.

FIG. 8 summarizes the procedure of FIG. 7 via a timing diagram 800 that illustrates selected operations of an HLOS 802, one or more RISC applications 804, an ADSP (and/or GPU) 806 and a memory processor 808. At 810, the HLOS allocates the contiguous memory buffer, which is defined by the memory processor at 812. At 814, the HLOS loads an application SW image to the memory buffer via the memory processor, which receives and stores the image at 816. At 818, the HLOS shares the title of the buffer to a microKernel of the ADSP, which receives the title at 820. At 824, the microKernel of the ADSP creates the E3 object and then shares the E3 object reference with the HLOS. At 822, the HLOS invokes an E3 claim to obtain a memory region R. At 826, the ADSP maps physical buffer T as a memory region R in a virtual address space while ensuring that an SMMU input address equals the output address. At 828 and 830, a RISC App (such as the aforementioned SEE of FIG. 6) configures the memory processor so that physical buffer T is owned by E3. At 832, the HLOS shares the memory region R with the ADSP microKernel, which then verifies the exclusive memory region R at 834 (using procedures described above).

Insofar as claim schematics are concerned, the Claim is configured to ask the supervisor SW for exclusive access rights. In some use cases, a client may require a guarantee of exclusive access to a region of memory that it has been given. The guarantee might be provided by the client's supervisory SW layer (e.g. the "supervisor") but it is generally better if the guarantee is provided by HW and/or firmware (FW). Note that physical memory in an un-claimed state is represented by the concept of "title" object. Given a "title," a client can call the supervisor to "claim" the memory for the Exclusive Execution Environment object (E3). In one specific example, the "claim" is in the form: Claim (in interface E3, in interface title, out interface region).

Insofar as verification is concerned, the function "Verify-Claim" attempts to independently verify the exclusivity claim. However, note that a successful "Claim" does not guarantee exclusive access if the supervisor SW is compromised. Accordingly, the Exclusive Execution Environment (E3) described herein employs HW and/or FW to verify that the supervisor SW has complied with the Claim semantics. As such, after a successful Claim of exclusive access, the client can use "verifyClaim( )" to confirm the Claim semantics to the client's Exclusive Execution Environment (E3) object. The E3 object defines the boundary to which the exclusive access is granted. Note that E3 is typically a process or part of a process. In one specific example, the "verifyClaim" is in the form: VerifyClaim (in interface E3, in interface region).

In one exclusive access use case example, where the device modem supports MSA to gain exclusive access to its memory, the modem boot SW claims exclusive rights. One or more xPUs and bypass checker HW validate that non-modem entities (including TZ entities) cannot access modem memory. Note that this assumes that the MSA can start with a root key. In another use case example, the aforementioned MSA mechanism is adapted to allow ADSP (and/or GPU) apps to claim exclusive memory regions. Only the microKernel (with about 30 KB of code) can access the exclusive regions. One particular use case for exclusive access is Secure iTouch, which involves Touch Sensor processing. In that use case example, the modem boot ROM is modified (if needed) to start with the ADSP's tightly coupled memory (TCM) address and the DDR xPU is modified (if needed) to route fault interrupts to ADSP.

Still further, there are various systems and methods that may be used to map the aforementioned Claim( ) to hardware by having boot ROM authenticate using a non-Original Equipment Manufacturer (OEM) key, i.e. a SoC vendor key (so as to deny attacks from TZ/Monitor/OEM boot code).

Table I summarizes two Claim( ) implementation examples.

TABLE I

| Claim ( ) implementation | xPU-based | SMMU-based |
|---|---|---|
| HW claim semantics: | Use bypass checker to ensure "Claim( )" traffic bypass SMMUs under control of HYPERVISOR/TZ/Kernel Use MMU output to drive "E3" signal | SMMU adds 3rd layer access control with HW commands to manage the permission bits, etc. Page Table Entries (PTEs) with "Claim( )" semantics are immutable to SW once in "exclusive" state. Special mode HW commands can still change Stream ID (SID) management moves from uKernel to HW |
| Master vs. Slave: | Slave protection | Master protection with MMU adding extra layer for permission checks on all masters including CPU subsystems (CPUSS) |
| 4K fragmentation? | No fragmentation | Memory can be claimed at 4K granule |

Hence, in at least some examples, the EEE domain ensures a "HW guarantee" of the claimed exclusive access, which is not affected by HLOS/HYPERVISOR/TZ/Secure Monitor stack of system SW. The architectures described herein also allow a centralized HW interface to program the HW through API semantics so as to provide the capability to map a buffer with exclusive access. The HW supports the exclusive semantics via a DDR MPU slot ownership protocol where ADSP verifies that TZ cannot access the aperture and the bypass check to ensure SMMU does not affect access permissions.

Additional Exemplary Systems and Methods

Figure 9:
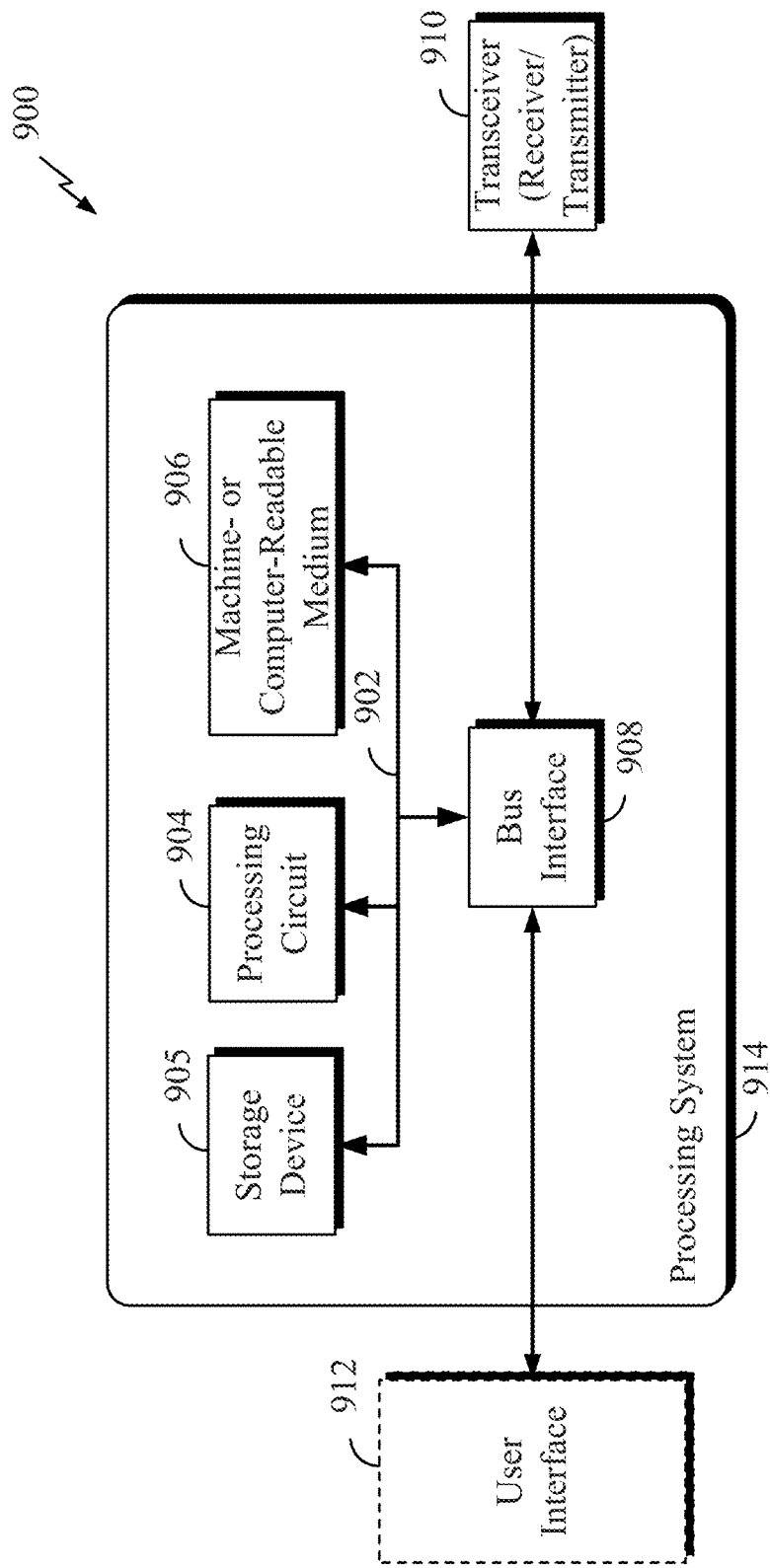
FIG. 9 is a block diagram illustrating an example of a hardware implementation for an apparatus employing a processing system that may exploit the systems, methods and apparatus of FIGS. 1-8.

FIG. 9 illustrates an overall system or apparatus 900 in which the systems, methods and apparatus of FIGS. 1-8 may be implemented. In accordance with various aspects of the disclosure, an element, or any portion of an element, or any combination of elements may be implemented with a processing system 914 that includes one or more processing circuits 904, such as a SoC incorporating the RISC processing circuit of FIG. 2. For example, apparatus 900 may be a user equipment (UE) of a mobile communication system, a server platform or, more typically, a minimally-equipped IoT device such as a key fob, security badge, home sensor, etc. Depending upon the device, apparatus 900 may be used with a radio network controller (RNC).

In the example of FIG. 9, the processing system 914 may be implemented with a bus architecture, represented generally by bus 902. The bus 902 may include any number of interconnecting buses and bridges depending on the specific application of the processing system 914 and the overall design constraints. The bus 902 links various circuits including one or more processing circuits (represented generally by the processing circuit 904), the storage device 905, and a machine-readable, processor-readable, processing circuit-readable or computer-readable media (represented generally by a non-transitory machine-readable medium 906) The bus 902 may also link various other circuits such as timing sources, peripherals, voltage regulators, and power management circuits, which are well known in the art, and therefore, will not be described any further. The bus interface 908 provides an interface between bus 902 and a transceiver 910. The transceiver 910 provides a means for communicating with various other apparatus over a transmission medium. Depending upon the nature of the apparatus, a user interface 912 (e.g., keypad, display, speaker, microphone, joystick) may also be provided but is not required, particularly for IoT devices.

The processing circuit 904 is responsible for managing the bus 902 and for general processing, including the execution of software stored on the machine-readable medium 906. The software, when executed by processing circuit 904, causes processing system 914 to perform the various functions described herein for any particular apparatus. Machine-readable medium 906 may also be used for storing data that is manipulated by processing circuit 904 when executing software.

One or more processing circuits 904 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 906. The machine-readable medium 906 may be a non-transitory machine-readable medium or computer-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 906 may reside in the processing system 914, external to the processing system 914, or distributed across multiple entities including the processing system 914. The machine-readable medium 906 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 906 may have one or more instructions which when executed by a processing circuit of a computing system equipped with a trusted execution environment causes the processing circuit to: designate a portion of a memory space of the computing system as an exclusive execution environment domain that components of the trusted execution environment are forbidden to access; prevent access by components of the trusted execution environment to the exclusive execution environment domain; and access the exclusive execution environment domain using components of the computing system that are outside the trusted execution environment to, for example, store or retrieve data. Note that, by "outside the trusted execution environment," it is meant that these components (which could be HW, SW or FW components or some combination thereof) are not subject to the requirements and protocols of the trusted execution environment. In some examples, the computing system has a core processor and a DSP and the instructions are operative to control the DSP to forbid access to the exclusive execution environment domain by components of the core processor. Still further, the instructions may be operative to confirm the exclusivity of the exclusive execution environment domain by instructing a component of the trusted execution environment attempt to access the exclusive execution environment domain. In many of the examples described herein, the components outside the trusted execution environment are components of the ADSP (and/or GPU) of the exemplary SoC described above.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a DSP, an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processing circuit 904 illustrated in FIG. 9—or components thereof—may be a specialized processing circuit (e.g., an ASIC)) that is specifically designed and/or hard-wired to perform the algorithms, methods, and/or blocks described in FIGS. 1, 2, 3, 4, 5, 6, 7 and 8 (and those illustrated in FIGS. 9, 10, 11 and 12, discussed below). Thus, such a specialized processing circuit (e.g., ASIC) may be one example of a means for executing the algorithms, methods, and/or blocks described in FIGS. 1, 2, 3, 4, 5, 6, 7 and 8 (and those illustrated in FIGS. 9, 10, 11 and 12, discussed below). The machine-readable storage medium may store instructions that when executed by a specialized processing circuit (e.g., ASIC) cause the specialized processing circuit to perform the algorithms, methods, and/or blocks described herein.

Figure 10:
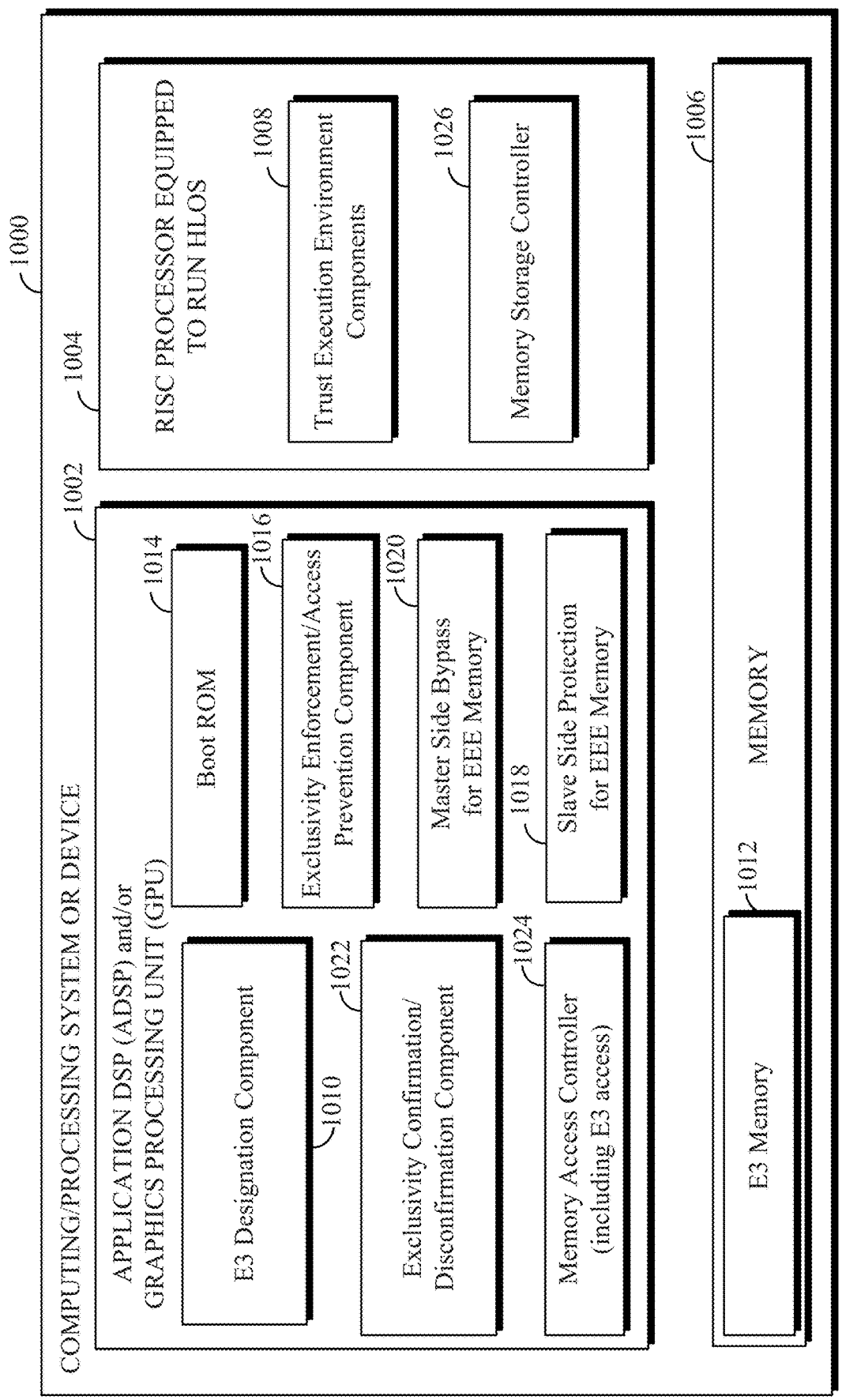
FIG. 10 is a block diagram illustrating exemplary components of a computing and/or processing system equipped with components configured to implement and enforce the exclusive execution environment (E3).

FIG. 10 illustrates selected and exemplary components of a computing or processing system or device 1000 (such as an IoT) having an ADSP 1002 (and/or GPU or other general processor (GP)) that operates in conjunction with a RISC processor 1004 (equipped to run a HLOS) and a memory 1006. The RISC processor includes Trusted Execution Environment components 1008 (such as TZ components or a subset of TZ components). An E3 (or EEE) designation component 1010 operates to designate a portion of the memory space associated with memory 1006 as E3 memory 1012, i.e. an E3 domain that the trusted execution environment components 1008 are forbidden to access. As already explained, the designation of the E3 memory may be performed in conjunction with ADSP boot ROM (as represented by boot ROM 1014). The exclusivity of the E3 memory may be enforced by an exclusivity enforcement/access prevention component 1016 that operates to forbid access to the E3 domain by the TZ components 1008 of the core processor 1004 and then, in conjunction with other components, blocks or prevents TZ components from accessing the E3 memory 1012. Enforcement may be facilitated by a slave side protection component 1018 (that provides slave-side protection of the memory device providing the memory space of the E3 domain as described above) and a master side bypass component 1020 (that provides a master-side bypass for the ADSP as also described above).

The exclusivity is confirmed or disconfirmed by an exclusivity confirmation/disconfirmation component 1022 that controls or triggers one of the TZ components 1008 to attempt to access the E3 memory 1012 of the exclusive execution environment. As already explained, if access to the memory of the E3 domain is gained by the component of the trusted execution environment, exclusivity is thereby disconfirmed. Otherwise, if access to the memory of the E3 domain is refused to the component of the trusted execution environment, exclusivity is thereby confirmed. The ADSP may include a memory access controller 1024 that provides access to the memory 1006 including the E3 memory portion 1012 (i.e. to store/write data therein or retrieve/read data therefrom). The RISC processor may include its own memory storage controller 1024 that provides access to non-exclusive portions of memory 1012 (i.e. to store/write data therein or retrieve/read data therefrom). Note that the various components of FIG. 10 may be implemented, in some examples, as a circuit or circuit component for performing the corresponding operations.

The various components of FIG. 10 may be replaced with a suitable means for performing or controlling corresponding operations. Hence, in at least some examples, means are provided for designating a portion of a memory space of the computing system as an exclusive execution environment domain that components of the trusted execution environment are forbidden to access; means are provided for preventing access by components of the trusted execution environment to the exclusive execution environment domain; and means are provided for accessing the exclusive execution environment domain using components of the processor that are outside the trusted execution environment to, for example, store or retrieve data.

Still further, means may be provided to forbid access to the exclusive execution environment domain by components of the core processor. Means may be provided for slave-side protection of the memory space of the exclusive execution environment domain and means may be provided for providing a means for master-side bypass to the memory device to permit components of the DSP to access the exclusive execution environment domain. As noted, the term DSP is intended to encompass a wide variety of non-core processors such as GPUs. Means may be provided for bootstrapping from a local ROM. Means may be provided for confirming the exclusivity of the exclusive execution environment domain by having a component of the trusted execution environment attempt to access the memory of the exclusive execution environment domain. This may include means for confirming the exclusivity if access to the memory of the exclusive execution environment domain is refused to the component of the trusted execution environment and means for disconfirming the exclusivity if access to the memory of the E3 domain is gained by the component of the trusted execution environment.

The various components of FIG. 10 may be represented, in some examples, as a set of instructions for controlling a programmable processing circuit or device to perform the corresponding operations. Hence, in at least some examples, instructions are provided for designating a portion of a memory space of the computing system as an exclusive execution environment domain that components of the trusted execution environment are forbidden to access; instructions are provided for preventing access by components of the trusted execution environment to the exclusive execution environment domain; and instructions are provided for accessing the exclusive execution environment domain using components of the processor that are outside the trusted execution environment to, for example, store or retrieve data.

Still further, instructions may be provided to forbid access to the exclusive execution environment domain by components of the core processor. Instructions may be provided for slave-side protection of the memory space of the exclusive execution environment domain and instructions may be provided for providing a master-side bypass, as discussed above. Instructions may be provided for bootstrapping from a local ROM. Instructions may be provided for confirming the exclusivity of the exclusive execution environment domain by having a component of the trusted execution environment attempt to access the memory of the exclusive execution environment.

Figure 11:
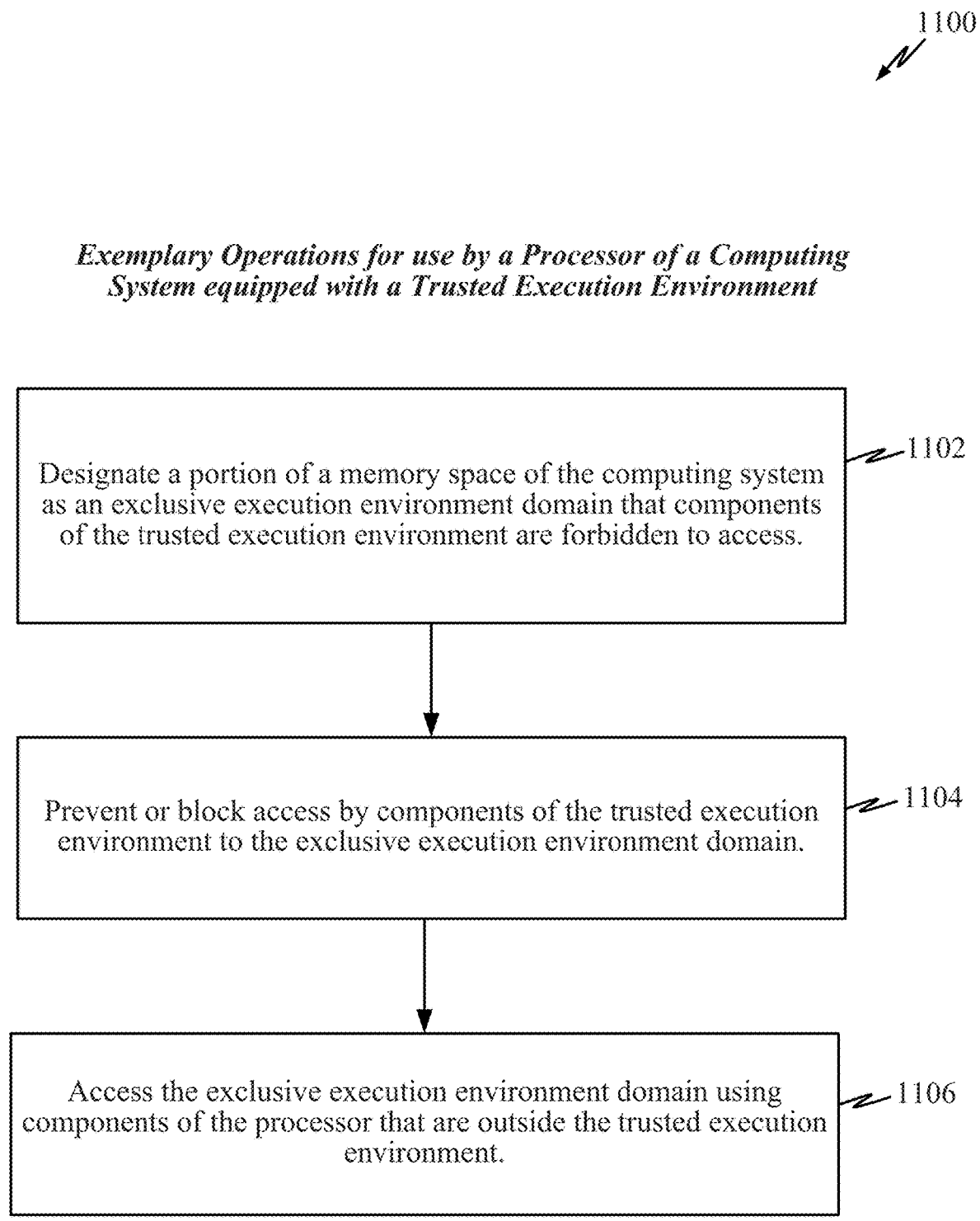
FIG. 11 summarizes exemplary procedures for use by a processor of a computing system equipped with a trusted execution environment.

FIG. 11 broadly illustrates and summarizes methods or procedures 1100 that may be performed by suitably equipped processing devices or components. In particular, FIG. 11 illustrates exemplary operations for use by a processor of a computing system equipped with a trusted execution environment. Briefly, at 1102, a portion of a memory space of the computing system is designated as an exclusive execution environment (E3) domain that components of the trusted execution environment are forbidden to access. At 1104, components of the trusted execution environment are prevented, precluded, prohibited, stopped or otherwise blocked from accessing the exclusive execution environment domain. At 1106, the exclusive execution environment domain is accessed using components of the processor that are outside the trusted execution environment to, for example, obtain, store, write or retrieve data. As already explained, in some examples the computing system may include an ARM®-based processor of an IoT device that does not implement a full trusted execution environment (such as a full version of TrustZone®). Details of exemplary implementations are provided above.

FIG. 12 further illustrates and summarizes methods or procedures 1200 that may be performed by suitably equipped ADSP processor and/or GPU of a computing system having a RISC processor running an HLOS and providing a trusted execution environment (or portion thereof). At 1202, a portion of a memory space of a computing system having a RISC core processor and an ADSP and/or GPU (or other general processor (GP)) is designated as an exclusive execution environment (EEE or E3) domain that components of the trusted execution environment (such as components of a reduced version of the TrustZone® execution environment) are forbidden to access, wherein the E3 domain is initially designated by the ADSP (or GPU) while bootstrapping from a local read only memory (ROM). At 1204, the ADSP (or GPU) is used to forbid access to the E3 domain by components of the RISC core processor, wherein the E3 domain is enforced by a hardware component of the ADSP (or GPU) that provides slave-side protection of the memory space of the E3 domain and wherein the computing system includes a MPU that provides a master-side bypass to permit components of the ADSP or GPU to access the E3 domain. At 1206, the exclusivity of the E3 domain is confirmed or disconfirmed by having a component of the trusted execution environment attempt to access the memory space of the E3 domain. At 1208, if access to the memory of the E3 domain is gained by the component of the trusted execution environment, exclusivity is thereby disconfirmed. Otherwise, if access to the memory of the E3 domain is refused to the component of the trusted execution environment, exclusivity is thereby confirmed. Exemplary techniques for implementing these features are detailed above.

Note that, herein, the terms "obtain" or "obtaining" broadly cover, e.g., calculating, computing, generating, acquiring, receiving, retrieving, inputting or performing any other suitable corresponding actions. Note also that aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

Moreover, in the following description and claims the terms "coupled" and "connected," along with their derivatives, may be used. It should be understood that these terms are not intended as synonyms for each other. Rather, in particular aspects, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An aspect is an implementation or example. Reference in the specification to "an aspect," "one aspect," "some aspects," "various aspects," or "other aspects" means that a particular feature, structure, or characteristic described in connection with the aspects is included in at least some aspects, but not necessarily all aspects, of the present techniques. The various appearances of "an aspect," "one aspect," or "some aspects" are not necessarily all referring to the same aspects. Elements or aspects from an aspect can be combined with elements or aspects of another aspect.

Not all components, features, structures, characteristics, etc. described and illustrated herein need be included in a particular aspect or aspects. If the specification states a component, feature, structure, or characteristic "may," "might," "can" or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In each figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be noted that, although some aspects have been described in reference to particular implementations, other implementations are possible according to some aspects. Additionally, the arrangement and/or order of circuit elements or other features illustrated in the drawings and/or described herein need not be arranged as illustrated and described. Many other arrangements are possible according to some aspects.

What is claimed is:

1. A method for use by a processor for of a computing system equipped with a trusted execution environment, the method comprising:
    designating a portion of a memory space of the computing system as an exclusive execution environment domain that components of the trusted execution environment are forbidden to access;
    protecting the portion of the memory space against any compromised components of the trusted execution environment by preventing access by components of the trusted execution environment to the exclusive execution environment domain; and
    accessing the portion of the memory space of the exclusive execution environment domain using only components of the exclusive execution environment domain.

2. The method of claim 1, wherein the computing system has a core processor and a digital signal processor (DSP) and the method is performed by the DSP to forbid access to the exclusive execution environment domain by components of the core processor.

3. The method of claim 2, wherein the core processor is a reduced instruction set computing (RISC) processor and the method is performed by the DSP to forbid access to the exclusive execution environment domain by components of the RISC processor.

4. The method of claim 2, wherein the exclusive execution environment domain is enforced by a hardware component of the DSP that provides slave-side protection of a memory device providing the memory space.

5. The method of claim 2, further including providing a master-side bypass to a memory device providing the memory space to permit components of the DSP to access the exclusive execution environment domain.

6. The method of claim 2, wherein the exclusive execution environment domain is designated by the DSP while bootstrapping from a local read only memory (ROM) without depending on a system software stack in the trusted execution environment for a Chain of Trust.

7. The method of claim 1, further including confirming the exclusivity of the exclusive execution environment domain by having a component of the trusted execution environment attempt to access the exclusive execution environment domain.

8. A device comprising:
a memory device;
a trusted execution environment; and
a processor coupled to the memory device, the processor configured to:
designate a portion of a memory space of the memory device as an exclusive execution environment domain that the components of the trusted execution environment are forbidden to access;
protect the portion of the memory space against any compromised components of the trusted execution environment by preventing access by components of the trusted execution environment to the exclusive execution environment domain; and
access the portion of the memory space of the exclusive execution environment domain using only components of the exclusive execution environment domain.

9. The device of claim 8, wherein the device has a core processor and a digital signal processor (DSP) and wherein the DSP is configured to forbid access to the exclusive execution environment domain by components of the core processor.

10. The device of claim 9, wherein the core processor is a reduced instruction set computing (RISC) processor and wherein the DSP is configured to forbid access to the exclusive execution environment domain by components of the RISC processor.

11. The device of claim 9, wherein the DSP is further configured to enforce the exclusive execution environment domain using a hardware component of the DSP that provides slave-side protection of the memory device providing the memory space.

12. The device of claim 9, wherein the device includes a Memory Processor Unit (MPU) configured to provide a master-side bypass to the memory device to permit components of the DSP to access the exclusive execution environment domain.

13. The device of claim 9, wherein the DSP is configured to designate the exclusive execution environment domain by bootstrapping from a local read only memory (ROM) without depending on a system software stack in the trusted execution environment for a Chain of Trust.

14. The device of claim 8, wherein the processor is configured to confirm the exclusivity of the exclusive execution environment domain by controlling a component of the trusted execution environment to attempt to access the exclusive execution environment domain.

15. The device of claim 8, wherein the processor does not implement a full version of the trusted execution environment.

16. A device for use with a processor of a computing system equipped with a trusted execution environment, the device comprising:
means for designating a portion of a memory space of the computing system as an exclusive execution environment domain that components of the trusted execution environment are forbidden to access;
means for protecting the portion of the memory space against any compromised components of the trusted execution environment by preventing access by components of the trusted execution environment to the exclusive execution environment domain; and
means for accessing the portion of the memory space of the exclusive execution environment domain using only components of the exclusive execution environment domain.

17. The device of claim 16, wherein the computing system has a core processor and a digital signal processor (DSP) and wherein the DSP includes means for forbidding access to the exclusive execution environment domain by components of the core processor.

18. The device of claim 17, wherein the core processor is a reduced instruction set computing (RISC) processor and the DSP includes means for forbidding access to the exclusive execution environment domain by components of the RISC processor.

19. The device of claim 17, further comprising means for slave-side protection of a memory device providing the exclusive execution environment domain.

20. The device of claim 17, further comprising means for providing a master-side bypass to a memory device providing the memory space to permit components of the DSP to access the exclusive execution environment domain.

21. The device of claim 17, wherein the DSP includes means for bootstrapping from a local read only memory (ROM) without depending on a system software stack in the trusted execution environment for a Chain of Trust.

22. The device of claim 16, further comprising means for confirming the exclusivity of the exclusive execution environment domain by having a component of the trusted execution environment attempt to access the exclusive execution environment domain.

23. A non-transitory machine-readable storage medium for use with a computing system equipped with a trusted execution environment, the machine-readable storage medium having one or more instructions which when executed by at least one processing circuit of the computing system causes the at least one processing circuit to:
designate a portion of a memory space of the computing system as an exclusive execution environment domain that components of the trusted execution environment are forbidden to access;
protect the portion of the memory space against any compromised components of the trusted execution environment by preventing access by components of the trusted execution environment to the exclusive execution environment domain; and
access the portion of the memory space of the exclusive execution environment domain using only components of the exclusive execution environment domain.

24. The non-transitory machine-readable storage medium of claim 23, wherein the computing system has a core processor and a digital signal processor (DSP) and wherein the instructions are operative to control the DSP to forbid access to the exclusive execution environment domain by components of the core processor.

25. The method of claim 1, wherein the exclusive execution environment domain further comprises at least one hardware processing component of the computing system, and wherein access by components of the trusted execution environment is prevented to the portion of the memory space and the at least one hardware processing component.

26. The method of claim 1, further comprising:
using a high level operating system (HLOS), allocating a contiguous memory buffer;

using the HLOS, loading an application software image into the memory buffer;

using the HLOS, sharing a designator of the memory buffer with a microkernel; and using the microkernel, creating an exclusive execution environment object.

27. The method of claim 26, further comprising:

using the microkernel, sharing an object reference for the exclusive execution environment object with the HLOS;

using the HLOS, invoking a claim to a memory region; and in response to the invocation of the claim, using a component of the exclusive execution environment to map a physical buffer to the memory region.

28. The device of claim 8, wherein the exclusive execution environment domain further comprises at least one hardware processing component, and wherein the processor is further configured to prevent access by components of the trusted execution environment to the portion of the memory space and the at least one hardware processing component.

29. The device of claim 8, wherein the processor is further configured to:

allocate a contiguous memory buffer using a high level operating system (HLOS);

load an application software image into the memory buffer using the HLOS;

share a designator of the memory buffer with a microkernel; and create an exclusive execution environment object using the microkernel.

30. The device of claim 29, wherein the processor is further configured to:

share an object reference for the exclusive execution environment object with the HLOS;

invoke a claim to a memory region; and in response to the invocation of the claim, use a component of the exclusive execution environment to map a physical buffer to the memory region.

* * * * *